United States Patent [19]
Barham et al.

[11] Patent Number: 5,452,327
[45] Date of Patent: Sep. 19, 1995

[54] PROGRAMMABLE RANDOMLY TUNABLE DIGITAL DEMODULATOR

[75] Inventors: Steven T. Barham, Salt Lake City; Mark C. Austin, Centerville; Samuel C. Kingston, Salt Lake City, all of Utah

[73] Assignee: Unisys Corporation, Blue Bell, Pa.

[21] Appl. No.: 179,600

[22] Filed: Dec. 28, 1993

[51] Int. Cl.[6] .............................................. H04B 1/69
[52] U.S. Cl. .................................... 375/208; 375/209; 375/210
[58] Field of Search .............................. 375/1, 5, 96; 364/724.03

[56] References Cited

U.S. PATENT DOCUMENTS 4,627,079 12/1986 von der Embse ...................... 375/96
4,777,657 10/1988 Gillaspie ................................ 375/5
5,060,180 10/1991 Kingston et al. ................ 364/724.03
5,381,446 1/1995 McIntosh ................................ 375/1

Primary Examiner—Salvatore Cangialosi
Attorney, Agent, or Firm—John B. Sowell; Mark T. Starr

[57] ABSTRACT

A programmable randomly tunable digital demodulator is provided with a carrier recovery loop and a PN code clock recovery loop each having a programmable digital loop filter coupled in series therein. Each digital loop filter is controlled by a timing control which is capable of controlling the carrier frequency tuning and the PN tuning frequency under the control of a microprocessor. A replica PN generator is programmed to produce an epoch signal when the transmitted carrier frequency and/or chipping rate is varied in a pseudorandom manner and is coupled to the timing controls so that the modulator replicates the received variable rate signals.

6 Claims, 3 Drawing Sheets

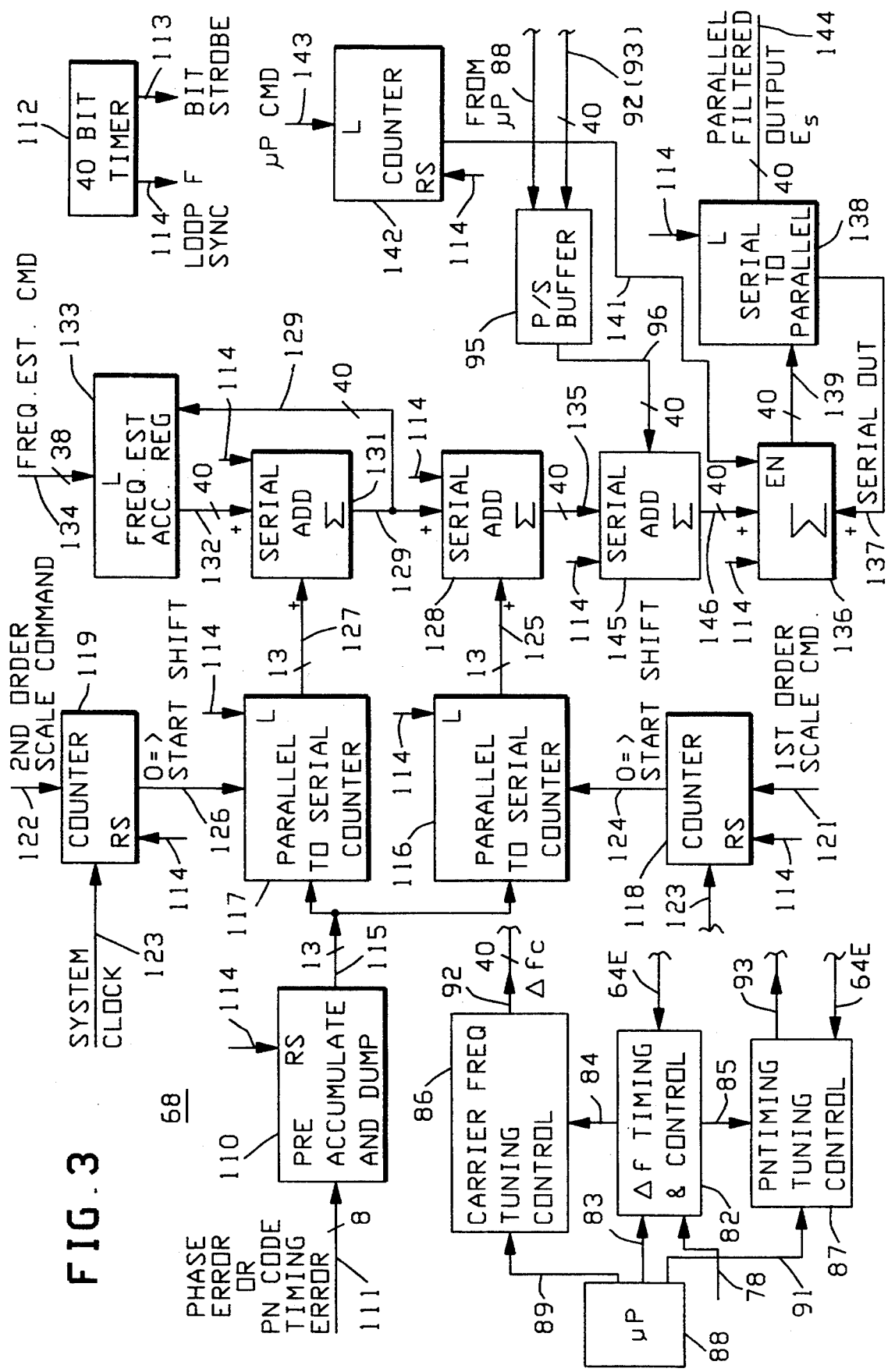

PROGRAMMABLE RANDOMLY TUNABLE DIGITAL DEMODULATOR

BACKGROUND OF THE INVENTION

1. Field of the Invention

The present invention relates to demodulators for demodulating received PN signals that have the carrier frequency and/or the PN chip rate varied to increase covertness. More particularly, the present invention relates to a novel tunable digital demodulator used to process received tunable carrier frequencies and/or tunable chipping rate signals.

2. Description of the Prior Art

Our U.S. Pat. No. 5,099,494 shows and describes a Six Channel Digital Demodulator which has been implemented on a single chip with other components of the demodulator supporting structure. This demodulator does not include structure which could demodulate tunable carrier frequencies or tunable chipping rates.

Our U.S. Pat. No. 4,841,552 shows and describes a programmable digital second order loop filter of the type used in the carrier recovery loops and in PN code tracking loops of a digital demodulator. The programmable filters in this reference are turnable only through a microprocessor controller which is slow relative to the incoming signal.

Heretofore, it was known that tunable frequency carrier and PN code chipping rates could be modulated on to data being transmitted to increase the covertness of the transmitted signals and to make the signals difficult to jam or to intercept.

It has been suggested that the carrier frequency could be demodulated by employing a variable frequency oscillator at the analog mixer in the first stage of the receiver. When programmable frequency synthesizers are employed to provide the tunable carrier frequency, an analog output is required as the needed input to the analog mixer. Such analog devices are large, complex and expensive when compared to digital devices which may be integrated into one or more semiconductor chips.

It has been suggested that a variable PN chipping rate could be demodulated by employing a variable frequency clock in the PN code clock recovery loop. When programmable frequency clock synthesizers or direct digital synthesizers are employed, the reference clock and the program commands are digital inputs employed to obtain an analog output, thus, this alternative system is large, complex and expensive when compared to pure digital systems.

It would be desirable to provide a digital tunable frequency demodulator that could be implemented on a digital chip with a digital demodulator without the need for expensive off chip analog devices.

SUMMARY OF THE INVENTION

It is a primary object of the present invention to provide a novel programmable randomly tunable digital demodulator.

It is a primary object of the present invention to provide a tunable digital demodulator used to process received tunable carrier frequencies and/or tunable PN chip rate frequencies.

It is a principal object of the present invention to make a cost effective modification of a known fixed frequency digital demodulator to provide a novel tunable frequency demodulator.

It is a principal object of the present invention to provide a novel tunable programmable digital loop filter for carrier recovery loops and tunable programmable PN code clock recovery loops of a tunable demodulator.

It is a principal object of the present invention to provide a novel serialized programmable loop filter which may be integrated into a single chip digital demodulator.

It is a general object of the present invention to provide a tunable digital demodulator that is very small in size and weight, requires low power and component real estate yet provides a simple and highly reliable structure operable in real time at very high frequencies.

According to these and other objects of the present invention, there is provided a programmable randomly tunable digital demodulator having a carrier recovery loop and a PN code clock recovery loop. A programmable digital loop filter is provided in said carrier recovery loop and in said PN code clock recovery loop. Each said digital loop filter comprises a first and second serial adder coupled in series and having an output coupled to a summing circuit. A third serial adder is interposed in series between the second serial adder and the summing circuit. A carrier code clock frequency tuning control is coupled to the third serial adder for tunably adjusting the output of the carrier and/or the code clock frequency in the respective loops in a predetermined manner. The carrier frequency may be frequency hopped and frequency shift keyed (FSK). In all such cases, the transmitted carrier frequency and/or chipping rate is varied in a known pseudo-random manner at the transmitter's modulator, thus, the modulator replicates in synchronism the modulating signals in order to cancel out or remove the modulating signals to successfully separate the transmitted data from the transmitted modulated signals.

BRIEF DESCRIPTION OF THE DRAWINGS

FIG. 3 is a detailed schematic block diagram of a preferred embodiment programmable variable frequency digital loop filter.

DESCRIPTION OF THE PREFERRED EMBODIMENT

Figure 1:
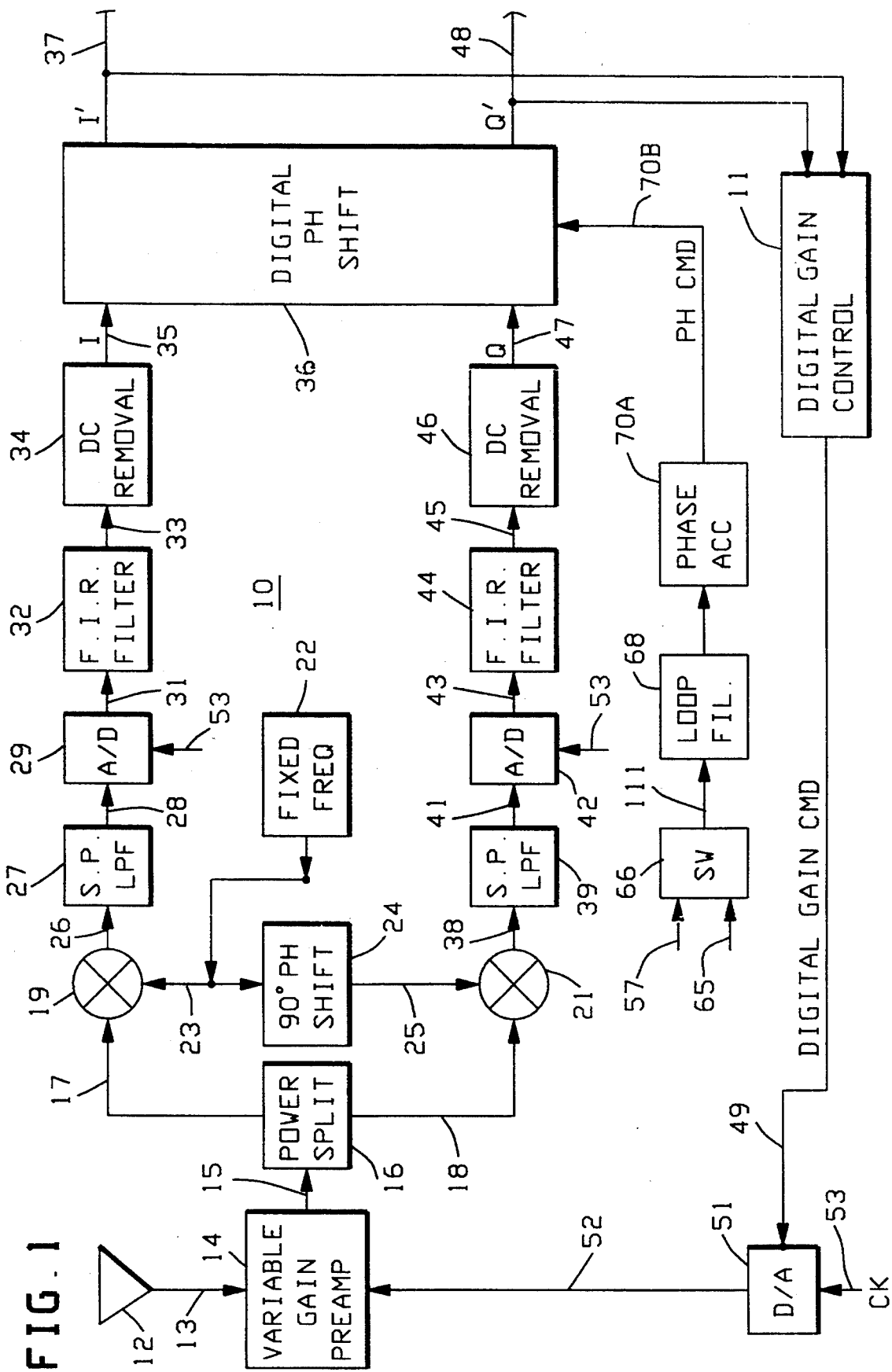
FIG. 1 is a schematic block diagram of a communications receiver pre-processing circuitry illustrating a preferred use of the present invention tunable digital demodulator.

Refer now to FIG. 1 showing a block diagram of a typical communications receiver pre-processing circuitry. Analog radio frequency (RF) signals received at antenna 12 are coupled via line 13 to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 of the type set forth in our U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals such as that shown on line 53 are applied to the digital blocks which occur after the A and D converters 29 and 42. The low pass filters 27 and 39 may be constructed as RC filter circuits and the FIR filters 32 and 44 may be constructed in the manner shown in our U.S. Pat. No. 4,808,939. It will be understood that all of schematic blocks shown in the FIG. 1 embodiment need not be constructed according to our previously mentioned patents by may be constructed by other equivalent circuits known in the prior art.

The digital phase shifter 36 is controlled by a digital phase command generated on line 70B by the phase accumulator 70A. The digital phase command is shown being generated by switch 66 having inputs 57 and 65 and an output on line 111 which is coupled through a novel programmable digital loop filter 68 which will be explained in greater detail hereinafter.

Figure 2:
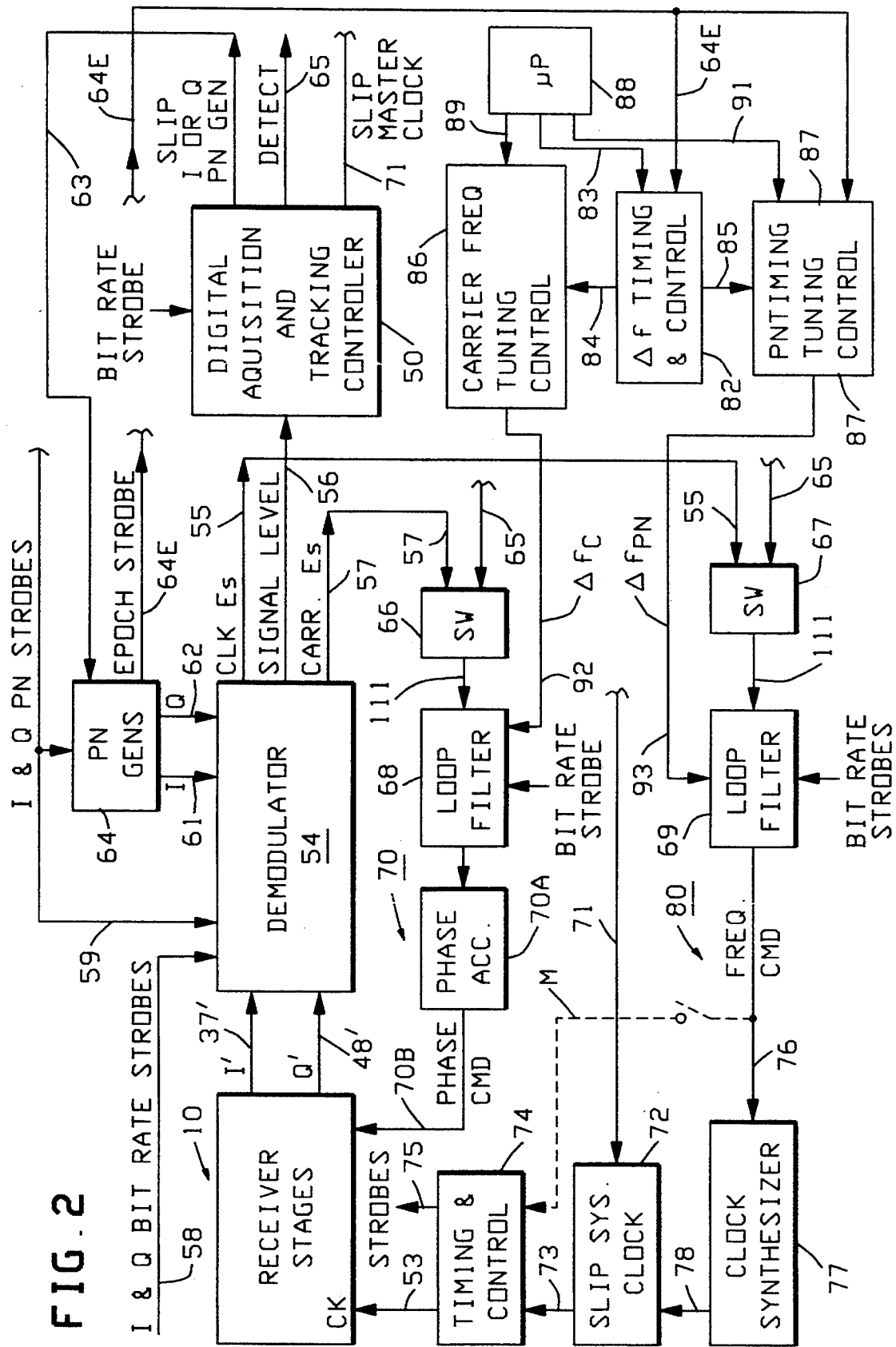
FIG. 2 is a schematic block diagram of a communications receiver showing the FIG. 1 preprocessing circuitry coupled to a demodulator and the present invention tunable digital loop filters.

Refer now to FIG. 2 showing a schematic block diagram of a communications receiver which includes the pre-processing circuity of FIG. 1 coupled to a demodulator of the type which produces error signals capable of controlling the clock or PN code tracking loop 80 and the carrier recovery tracing loop 70.

In FIG. 2 the receiver 10 is shown having phase rotated outputs 37' and 48', applied as inputs to a demodulator 54. The demodulator 54 of the present invention may be a commercially available demodulator or the demodulator described in our U.S. Pat. No. 5,099,494. The demodulator 54 is shown having a clock error signal output $E_s$ on line 55, a signal level output on line 56 and a carrier error signal output $E_s$ on line 57. Demodulator 54 is shown having strobe and timing input signals on lines 58 and 59 and PN code sequence inputs on line 61 and 62 to be described in greater detail hereinafter.

The signal level on line 56 is indicative of the signal level of the despread data and is applied to the digital acquisition and tracking controller 50. Digital acquisition and tracking controller 50 produces digital control signals on line 63 which are capable of slipping the PN generators that provide the I and Q PN codes on lines 61 and 62. The PN timing strobes on line 59 are employed to control the PN generator and to advance the PN generator to the next sequential output. The preferred method of generating the slip of the I or Q PN generator is to delete one of the I or Q PN strobe signals.

Digital acquisition and tracking controller 50 is adapted to produce a detection signal on output line 65 which indicates the original acquisition correlation and is applied to the switches 66 and 67 at the input of the digital loop filters 68 and 69 to close the carrier recovery loop 70 and code tracking loop 80.

During initial acquisition the control signal on output line 71 is employed to slip the master clock or system clock 72 which produces the system clock signal on line 73 applied to the timing and control circuits 74 shown producing the analog clock signal input on line 53 which is applied to the numerous components of the receiver stages 10. The sampling clock or system clock is the base clock signal employed to drive the receiver stages 10, the demodulator 54 and the digital acquisition and tracking controller 50. A plurality of strobe signals from the timing and control circuit 74 are shown on line 75 and will be explained in greater detail hereinafter. The code timing loop 80 is shown producing a digital frequency command signal on line 76 which is applied to the clock synthesizer 77 which produces an analog system clock signal on line 78. It will be understood that the clock synthesizer 77 may be a commercially available component or produced as one of the components on the integrated circuit of the digital receiver. Further, the block 72 indicating that the system clock is being slipped actually occurs at the output of the clock synthesizer circuit 77 and is preferably not a part of the integrated circuit.

In the preferred embodiment of the present invention, the function of slipping the system clock is accompanied by deleting a predetermined quantity of system clock time equivalent to one-half of the time interval between PN strobe times. Further, the I and Q PN strobe times may be different. In the preferred embodiment of the present invention during initial acquisition of the data on the I or Q channel, it is preferred that the clock signal be slipped because it is a finer increment of PN time and once the digital acquisition and tracking controller indicates that acquisition correlation has been obtained the switches 66 and 67 in the carrier recovery loop and code timing loops are closed. The digital acquisition and tracking controller 50 then attempts to acquire the other I or Q data channel by slipping the PN generator with the signal previously explained on line 63. Once the I and A data channels have been acquired, the digital acquisition and tracking controller will shift into the tracking mode which does not employ the control signals on lines 63 and 71. Bypass circuit M shown in phantom lines may optionally be employed when the input signal is not sampled synchronous to the PN chip rate.

When a predetermined event occurs and it is desirable to change carrier and/or PN code frequency rates, an epoch strobe signal on line 64E is generated at the PN replica generators 64. The signal on line 64E is applied as a sync signal to the timing and control circuits 82. The timing and control circuits 82 are shown having an input on line 83 from microprocessor 88 which supplies command and setup information as a digital input. The system clock output from synthesizer 77 on line 78 is also applied to control circuits 82 to produce strobe outputs on lines 84 and 85 to carrier frequency tuning control 86 and PN timing tuning control 87 respectively. Microprocessor 88 initiates a command and supply setup information on lines 89 and 91 coupled to tuning controls 86 and 87 respectively. Tuning control 86 produces a digital value on line 92 representative of an offset in carrier frequency Δfc. Preferably the offset frequency Δfc comprises a series of changes rather than one abrupt change and maintains synchronization with the output of the PN generator on lines 61 and 62.

In a similar manner, tuning control 87 produces a digital value on line 93 representative of an offset in PN code clock rate Δfpn which is capable of changing the digital frequency command output on line 76 to the clock synthesizer 77, thus provides a tunable PN code tracking (clock) loop 80.

The carrier recovery tracking loop 70 is also tunable as a result of the digital value provided on line 92 to loop filter 68 which produces an output on line 94 to the carrier phase accumulator 78A which produces a phase command on line 70B which is coupled to the digital phase shifter 36 shown in FIG. 1.

The manner in which the digital commands on lines 92 and 93 provide variable tuning of the carrier frequency and the PN code clock frequency by control of the digital filters 68 and 69 will now be explained with reference to loop filter 68 and the carrier frequency loop 70.

Refer now to FIG. 3 showing a detailed schematic block diagram of a preferred embodiment digital tunable carrier frequency loop filter 68 for the tunable demodulator 54. The second order loop filters 68, 69 are identical and are used in the carrier recovery loop 70 and the code timing loops 80. The loop filters 68 and 69 are connected by line 111 to switches 66 and 67 respectively. Thus, the input to these filters has already passed through switches 66 and 67 and is presented on line 111 as the phase error signal or PN code timing error signal to the respective loop filter 68 or 69. The error signal on line 111 is applied to a pre-accumulate and dump circuit 110 which is not required if the bit strobe timing rate on line 113 to the 40 bit timer 112 is equal to or less than the 40 clock cycles which triggers the loop filter sync pulse at the output of the timer 112 on line 114. The loop filter sync pulse is applied via line 114 to the restart input of the preaccumulated and dump circuit 110 to produce a 13 bit output on line 115 which is applied to the inputs of the first and second parallel-to-serial converters 116 and 117. The parallel-to-serial converters 116 and 117 are shown having programmable inputs each of which comprise presettable counters 118 and 119 shown having respective first order scale command inputs and second order scale command inputs which are programmable from a remote microprocessor 88 on their lines 121 and 122. The presettable counters are shown having system clock inputs 123 and loop filter sync inputs on their lines 114 which restart the counters 118 and 119 respectively. The output of the first order counter 118 on line 124 delays the output of the parallel-to-serial converter 116 while the present counter is counting down to zero and starts the serial output at the count of zero on line 125. Similarly, the output on line 126 delays the output of the counter 117 until a count zero is reached and starts the shifting out of the information to its output line 127. The effect of delaying the start of the shifting out of the data converters 116 and 117 is to multiply the output data by a power of two for each of the shift positions. A first programmable one bit serial adder 128 is shown receiving the 13 bit input on line 125 and a second input on line 129 from a second programmable one bit serial adder 131. The second serial adder 131 receives a 40 bit programmable input on line 132 from a programmable accumulator register 133 which has a microprocessor frequency estimate command input on line 134 and a serial data input from line 129. The second order stage receives a 38 bit frequency estimate command which is loaded into the frequency estimate accumulator register 133 and presented as a serial 40 bit output on line 132 to a positive input of the second order serial adder 131. The output of the second order serial adder 131 on line 139 is recirculated back on line 129 as part of the accumulation and is also provided as an input to the first order serial adder 128. The output of the first order serial adder 128 on line 135 is provided as 40 bit input to a third serial adder 145. The 40 bit output from the third serial adder on line 146 is applied as an input to the summing circuit 136 of the programmable output means. The second input to the summing circuit 136 on line 137 is provided from the serial to parallel converter 138 which receives the output of the summing circuit 136 on line 139. Stated differently, the output from the summing circuit 136 which is not to be used is circulated through the serial-to-parallel register 138 and added back in to the next 40 bit sample or result of the next sample or result, thus, the effect is to ripple the precision of the lower unused bits into the higher order used bits so as to avoid any truncation error which would result in a half bit error to the least significant bit used in the output. The proper sequence for producing a shortened output on parallel filtered output line 144 starts by loading a command in counter 142 which raises a count enable signal on line 141 to permit the recirculation of information on line 137 to enter the summing circuit 136 and produce the 40 bit output on line 139 which is loaded into the serial-to-parallel register 138. Thus, the error signal output on line 144 has its accuracy preserved even though the output comprises fewer than 40 significant bits. In this manner, the output on line 144 has an average quantization error of one-half of one bit of the 40 bit output on line 135. Stated differently the novel loop filter structure 68 allows the loop filter to maintain 40 bit accuracy and integrity while reducing the number of output bits on line 144.

As explained hereinbefore, the carrier frequency tuning control 86 produces a digital offset signal Δfc on line 92. This 40 bit signal is applied to a parallel-to-serial buffer 95 which has a 40 bit serial output on line 96 that is applied to serial adder 145. The three serial adders 128, 131 and 145 are receiving serial bits of information and the 40 bit designations are representative of the total number of serial bits. Each of serial adders requires its own unique loop filter sync signal 114 which has been compensated for the logic delay which occurs as single bits are processed through the logic pipeline that ends with a 40 bit parallel output on line 144.

While only one loop filter 68 has been described in detail, the second loop filter 69 would be substantially the same as filter 68 Δfpn input with an input on line 111 and a second PN offset frequency from PN timing tuning control 87 on line 93 the output from the associated digital filter 69 is applied to a clock synthesizer 77 via line 76 as shown in FIG. 2. A buffer like buffer 95 of filter 69 would have an input via line 93.

Having explained a preferred embodiment tunable demodulator 54 having a carrier recovery loop 70 and a code timing loop 80 each of which is provided with a novel tunable digital filter 68 and 69, it will now be appreciated that the second order loop filters may be programmed to receive variable frequency signals which facilitate the manufacture of a digital programmable randomly tunable demodulator. As explained hereinbefore and in our U.S. Pat. No. 5,060,180 a digital demodulator may be made on a single digital chip without the need for expensive off-chip analog devices even though the front end preprocessing circuits of the communications received are analog circuits. The prepossessing circuits permit conversion of the variable rate signals to be converted to digital format and to remain in digital format without having to process signals off chips in digital components.

What is claimed is:

1. A tunable digital demodulator for a spread spectrum communications receiver, comprising:
   analog receiver means for preprocessing analog data signals modulated by a carrier signal and pseudo noise (PN) coded signals,
   analog to digital converter means for converting said preprocessed modulated analog data signals to digital format,
   digital demodulator means coupled to said analog to digital converter means,
   said digital demodulator means comprising a carrier recovery loop and a PN code clock recovery loop,
   said recovery loops each comprising a programmable digital loop filter,
   PN generator means coupled to said demodulator means,
   timing control means coupled to said PN generator means,
   said timing control means having an output coupled as an input to said digital loop filter, and
   microprocessor means coupled to said timing control means for generating digital command and control signals to said timing control means for changing the digital frequency of said digital loop filters and the frequency of signals in one or more said of said recovery loops.

2. A tunable digital demodulator as set forth in claim 1 wherein said timing control means comprises a carrier tuning control circuit and a PN timing tuning control circuit coupled to a timing and control circuit.

3. A tunable digital demodulator as set forth in claim 2 wherein said microprocessor means is coupled to said carrier tuning control circuit and said PN timing tuning control circuit for controlling either or both recovery loop.

4. A tunable digital demodulator as set forth in claim 3 wherein said PN generator means is provided with an output line coupled to said tuning control means for providing epoch strobe output signal adapted to strobe and enable said carrier tuning control circuit and said PN tuning control circuit.

5. A tunable digital demodulator as set forth in claim 1 wherein said digital loop filters each comprise:
   programmable scaling means having an input adapted to receive a parallel digital error signal and produce as an output serial phase error signals,
   first and second serial adder means coupled to the serial output signals of said programmable scaling means and pipeline coupled to each other,
   third serial adder means coupled to the output of said first adder means and to said timing control means, programmable output stage means, and
   the output of said third serial adder being coupled to said programmable output stage means for providing filtered digital output error signals capable of tuning the frequency of said carrier recovery loop and said PN code recovery loop.

6. A tunable digital demodulator as set forth in claim 5 wherein said output stage means comprises a summing circuit coupled to the output of said third serial adder and a serial to parallel converter coupled to the output of said summing circuit.

* * * * *